June 14, 1949.　　　J. W. VAN RIPER　　　2,473,230
EXTRUSION APPARATUS
Filed Oct. 8, 1945

INVENTOR,
Jurian W. Van Riper,
BY John W. Steward,
ATTORNEY.

Patented June 14, 1949

2,473,230

UNITED STATES PATENT OFFICE 2,473,230

EXTRUSION APPARATUS

Jurian W. Van Riper, Fair Lawn, N. J., assignor to John Royle & Sons, Paterson, N. J., a corporation of New Jersey Application October 8, 1945, Serial No. 621,088

5 Claims. (Cl. 18—12)

In a known type of extruding machine there is a straight extruding bore to which reaches laterally thereof, as downwardly thereto, a feeding inlet or hopper by which the plastic material to be extruded is fed to the bore, which is provided at its discharge end with an extruding die, and in the bore is a rotary screw coaxial therewith and having external threading and which, when rotated in the appropriate direction, forces the material through the bore and toward and through the die. The screw threading is in as close relation as possible to the surface of the bore throughout its entire length so that backward escape of the material between them will be as completely as possible prevented, and with the purpose of more perfectly insuring accomplishment of this object the land of the threading (or each land thereof if the threading comprises more than one thread, as is frequently so) exists as a cylindrically formed surface as distinct from an edge. But with the screw thus formed it is well known that certain undesirable and often quite troublesome conditions ensue, depending on the quality of the material that is undergoing extrusion. Thus such material, while generally a plastic and as such generally responsive to the intended treatment by the machine, may include vagrant pieces or bodies which are not so responsive, as unduly hardened particles or bodies of the plastic itself or fragments of foreign matter, such as pieces of wood or fragments of fabric, etc., which are hard and brittle or at any rate do not respond to extrusion as readily as the bulk of the material being treated. Some of such fragments of course are advanced by the screw from the hopper to and through the die in more or less the shape and size which they had on entering the hopper, being left in that state in the extruded product as may be intended. But others are of such size and so hard that they do not undergo advance by the screw but remain in the hopper, and often they are the cause of damage to the fixed structure or screw, by fracturing the same, if they are hard enough to oppose substantially positive resistance to the screw's rotation.

My object by this invention is so to construct the machine that the indicated troublesome effects may be substantially lessened. To this end the threading of the screw for a part of its helical extent is made to provide a cylindrically formed land, as usual, facing and next adjoining the surface of the bore but for a part of the helical extent of the threading which next adjoins said first-named part thereof, said threading presents an edge to and next adjoining said bore surface, and preferably this second-named part of the threading has an inclined surface sloped away from said edge and relatively away from said first-named part; and the screw thus formed is arranged in the bore so that the first-named part of the threading will be within the portion of the bore uninterrupted by the feeding inlet or hopper and the second-named part of the threading will be within and extend helically preferably throughout at least the length of said portion of the bore which is interrupted by the feeding inlet.

By this construction, whereas the first-named part of the screw-threading continues to function as usual, the second-named part acts, specifically by its edge, to cut, masticate or grind, while the said inclined surface will serve to cam back or to compress those parts of said bodies which are not directly affected by said edge. Therefore an improved product results and the machine may be operated with less danger of injury to the fixed structure than is true in the case of the conventional machine.

Figure 1:
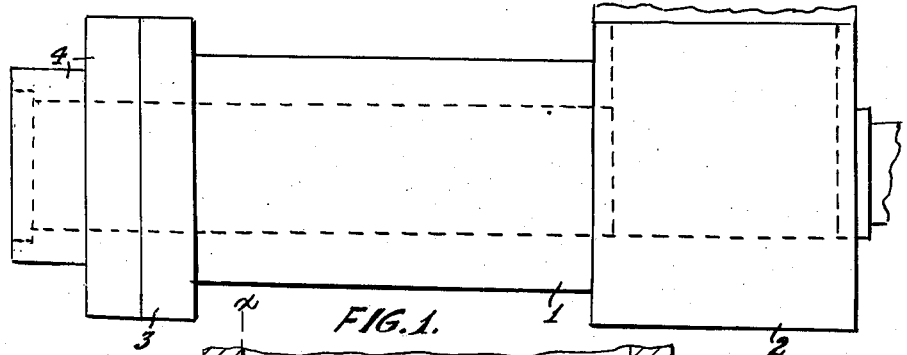
Fig. 1 is a side elevation of a form of a typical extrusion apparatus which may embody my invention.

In the example, I is the body portion of the fixed structure, here generally cylindrical and enlarged at 2 and 3. To one such enlargement is fixed in any way a head 4 equipped with a die 5 having its extrusion outlet at 6 coaxial with the body portion. Coaxial with the body portion and extending from the die to near the other end of said body portion the extrusion bore is formed in said body portion, as at 7. Adjoining said other end the body portion is formed with a hopper or feeding inlet 8 extending, here downwardly, to the bore. The bore, which is formed cylindrical throughout its whole extent, is as usual uninterrupted circuitously thereof from the hopper or inlet 8 to the die, or throughout substantially its whole extent except where the hopper is open thereto.

The extruding screw 9 has helical threading 10 of as approximately as possible the same diameter as the bore so that it fits the latter closely but the screw is free to rotate. There are two such threadings in the present example, identical in form and parallel and equally spaced, but according to this invention there is at least one. In the outer wall of the hopper an aperture 11 is formed through which the screw projects, its enlargement 9a closing the rear end of the bore and its protruding end being adapted to be coupled with some medium (not shown) for rotating the screw.

Figure 4:
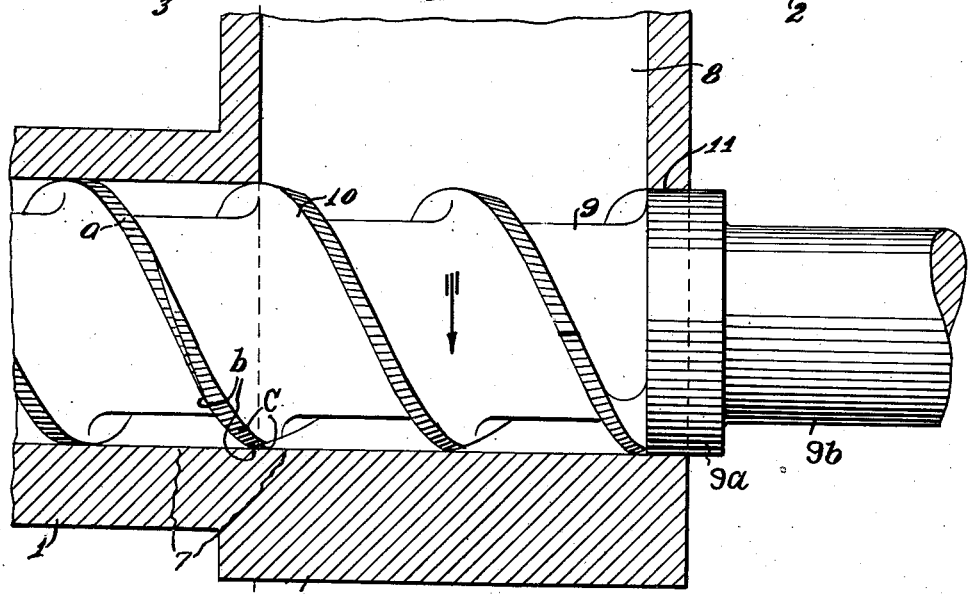
Fig. 4 is a fragmentary view showing the fixed structure in vertical longitudinal section and the screw in elevation.
Figure 2:
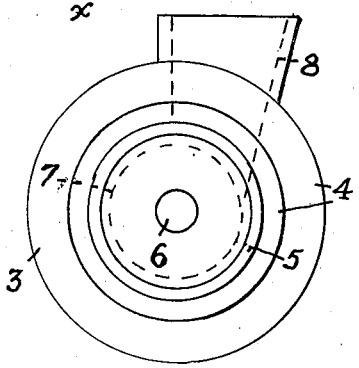
Figs. 2 and 3 are left-hand and right-hand elevations thereof, respectively.
Figure 3:
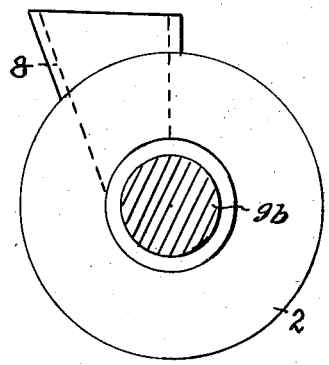

For a part of its helical extent each threading provides a cylindrically formed land a, or a surface facing and parallel with that of the bore. As for the part of its extent (here the remainder thereof) which next adjoins the first-named part of the screw said threading presents an edge b to said bore surface. Preferably it has an inclined surface c sloped from said edge relatively away from the first-named part. Such surface c is here shown as conforming to the side of a cone whose apex would coincide with the axis of the screw, the same as seen in Fig. 4 thus appearing straight, but such is not material. The juncture of the two such parts of said threading is adjacent a plane, as $x-x$, perpendicular to the bore and which divides its mentioned circuitously uninterrupted portion from the portion thereof interrupted by the hopper or inlet; preferably the juncture is, as shown, somewhat at that side of said plane occupied by the uninterrupted part of the bore.

In the preferred embodiment shown, the edge b of the screw is located at the peak of the leading face of each convolution of threading 10, the surface c, rearwardly of such edge b, being relieved from contact or approximate contact with the bore by reason of its location on a cone, which, as is evident from Figure 4, has a large apex angle. In other words, surface c slopes away from the bore at a very substantial angle, measured in a plane axial of the screw.

Having thus fully described my invention, what I claim is:

1. In an extrusion apparatus, the combination with fixed structure having a straight cylindrical extrusion bore, of a rotary screw in and coaxial with the bore and having external helical threading closely fitting the bore throughout substantially the whole length thereof, such threading for a first part of its helical extent providing a cylindrically formed land facing and next adjoining the surface of the bore, and for a second part of its helical extent, which next adjoins said first part of the screw threading, providing a helical edge to and next adjoining said bore surface, the surfaces on the convolutions of the threading on both sides of the helical edge in a direction axially of the screw being sharply relieved from the bore, said fixed structure having a feeding inlet extending to and thereby interrupting the circumferential continuity of substantially all that portion of the bore which contains the second part of the screw threading, and said bore having a substantially uninterrupted circumferential surface for all that portion thereof which contains the first part of the screw threading.

2. In an extrusion apparatus, the combination with fixed structure having a straight cylindrical extrusion bore, of a rotary screw in and coaxial with the bore and having external helical threading closely fitting the bore throughout substantially the whole length thereof, such threading for a first part of its helical extent providing a cylindrically formed land facing and next adjoining the surface of the bore, and for a second part of its helical extent, which next adjoins said first part of the screw threading, providing a helical edge to and next adjoining said bore surface, said helical edge lying on the peak of the leading face of each convolution of the threading, the surfaces on the convolutions of the threading on both sides of the helical edge in a direction axially of the screw being sharply relieved from the bore, said fixed structure having a feeding inlet extending to and thereby interrupting the circumferential continuity of substantially all that portion of the bore which contains the second part of the screw threading, and said bore having a substantially uninterrupted circumferential surface for all that portion thereof which contains the first part of the screw threading.

3. In an extrusion apparatus, the combination with fixed structure having a straight cylindrical extrusion bore, of a rotary screw in and coaxial with the bore and having external helical threading closely fitting the bore throughout substantially the whole length thereof, such threading for a first part of its helical extent providing a cylindrically formed land facing and next adjoining the surface of the bore, and for a second part of its helical extent, which next adjoins said first part of the screw threading, providing a helical edge to and next adjoining said bore surface, said helical edge lying on the peak of the leading face of each convolution of the threading, the leading face of the convolutions in such second part of the threading lying substantially radially of the axis of the screw, and that portion of each convolution of such part rearwardly of the helical edge lying on a cone of large apex angle, the apex lying substantially on the axis of the screw in a direction to the rear of each convolution, said fixed structure having a feeding inlet extending to and thereby interrupting the circumferential continuity of substantially all that portion of the bore which contains the second part of the screw threading, and said bore having a substantially uninterrupted circumferential surface for all that portion thereof which contains the first part of the screw threading.

4. In an extrusion apparatus, having in combination a fixed structure having a straight cylindrical extrusion bore, a rotary screw in and coaxial with the bore, an extrusion die associated with the forward end of the fixed structure, the fixed structure having a feeding inlet at the rear thereof some distance from the forward end of the fixed structure, the circumferential surface of the bore of the fixed structure in its forward end being substantially uninterrupted, the improved feeding screw having external helical threading in the forward portion thereof which fits within and cooperates with the forward part of the bore, the threading in such first part providing a cylindrically formed land facing and next adjoining the surface of the bore, and external helical threading on that portion of the screw next adjoining the first portion and cooperating with that part of the bore at the zone of the feeding inlet formed as a prolongation of the helical threading on the first portion, the threading on such second portion providing a helical edge to and next adjoining said bore surface, said helical edge lying on the peak of the leading face of each convolution of the threading, the surfaces on the convolutions of the threading on both sides of the helical edge in a direction axially of the screw being sharply relieved from the bore.

5. An extruding machine including, a body having a cylindrical bore provided with an extruding die at one end thereof and with a laterally extending material feed opening at its opposite end, a material extruding screw extending throughout the length of the bore of the body having at least one continuous uninterrupted thread, said thread having its peripheral face portion which extends between the die and feed opening disposed in a plane substantially parallel to the longitudinal axis of the bore of the body and having the peripheral face of the thread which extends across the feed opening disposed at an angle to the longitudinal axis of the bore so as to provide a cutting and masticating edge.

JURIAN W. VAN RIPER.

REFERENCES CITED

The following references are of record in the file of this patent:

UNITED STATES PATENTS

| Number | Name | Date |
|---|---|---|
| 1,375,623 | Bartels | Apr. 19, 1921 |
| 1,684,254 | Bailey | Sept. 11, 1928 |
| 1,886,592 | Royle | Nov. 8, 1932 |
| 1,951,427 | Lodge | Mar. 20, 1934 |
| 2,009,734 | Hiller | July 30, 1935 |
| 2,370,952 | Gordon | Mar. 6, 1945 |